(12) United States Patent
Ihrke et al.

(10) Patent No.: US 8,176,809 B2
(45) Date of Patent: May 15, 2012

(54) PLANAR TORSION SPRING

(75) Inventors: Chris A. Ihrke, Hartland, MI (US);
Adam H. Parsons, Tulsa, OK (US);
Joshua S. Mehling, League City, TX
(US); Bryan Kristian Griffith, Webster,
TX (US)

(73) Assignee: GM Global Technology Operations LLC, Detroit, MI (US)

( * ) Notice: Subject to any disclaimer, the term of this patent is extended or adjusted under 35 U.S.C. 154(b) by 772 days.

(21) Appl. No.: 12/331,844

(22) Filed: Dec. 10, 2008

(65) Prior Publication Data

US 2010/0145510 A1 Jun. 10, 2010

(51) Int. Cl.
*B25J 17/00* (2006.01)
*F16F 1/26* (2006.01)
(52) U.S. Cl. ............... 74/490.05; 74/490.01; 267/161
(58) Field of Classification Search ........... 267/154, 267/155, 157, 161, 279–282; 74/490.01–490.06; 901/15, 19, 27–29; 310/37, 38
See application file for complete search history.

(56) References Cited

U.S. PATENT DOCUMENTS

| | | | | | |
|---|---|---|---|---|---|
| 404,284 | A | * | 5/1889 | Johnson | 411/156 |
| RE13,699 | E | * | 3/1914 | Dennis | 267/161 |
| 1,176,632 | A | * | 3/1916 | Werner | 310/232 |
| 2,088,703 | A | * | 8/1937 | Hubbard et al. | 277/555 |
| 2,348,225 | A | * | 5/1944 | Petty | 367/183 |
| 2,407,757 | A | * | 9/1946 | MacCallum | 192/84.94 |
| 2,767,973 | A | * | 10/1956 | Ter Veen et al. | 73/514.31 |
| 2,778,626 | A | * | 1/1957 | Klepp | 267/154 |
| 2,836,912 | A | * | 6/1958 | Ranucci | 40/470 |
| 2,904,067 | A | * | 9/1959 | Johansson | 137/499 |
| 3,120,950 | A | * | 2/1964 | Hardison | 267/154 |
| 3,344,397 | A | * | 9/1967 | Elliott et al. | 367/189 |
| 3,495,687 | A | * | 2/1970 | Kelly et al. | 248/161 |
| 3,504,904 | A | * | 4/1970 | Galbato et al. | 267/151 |
| 4,285,054 | A | * | 8/1981 | McNeel | 367/183 |
| 4,323,994 | A | * | 4/1982 | Coogler | 367/183 |
| 5,577,414 | A | * | 11/1996 | Ogawa et al. | 74/490.03 |
| 5,901,613 | A | * | 5/1999 | Forslund | 74/490.03 |
| 6,121,743 | A | * | 9/2000 | Genov et al. | 318/568.11 |
| 6,244,644 | B1 | * | 6/2001 | Lovchik et al. | 294/111 |
| 6,286,225 | B1 | * | 9/2001 | Schimmels et al. | 33/645 |
| 6,422,547 | B1 | * | 7/2002 | Gibbens | 267/157 |
| 6,478,486 | B1 | * | 11/2002 | Ando | 400/236.2 |
| D472,824 | S | * | 4/2003 | Raab et al. | D10/63 |
| 6,904,691 | B2 | * | 6/2005 | Raab et al. | 33/503 |
| 7,188,544 | B2 | * | 3/2007 | Persson et al. | 74/490.03 |
| 7,594,547 | B2 | * | 9/2009 | Berry et al. | 173/1 |
| 7,611,103 | B2 | * | 11/2009 | Ha et al. | 248/125.2 |
| 7,987,742 | B2 | * | 8/2011 | Tachibana et al. | 74/490.01 |
| 2009/0091070 | A1 | * | 4/2009 | Mueller et al. | 267/157 |
| 2010/0234988 | A1 | * | 9/2010 | Buckingham et al. | 700/245 |
| 2011/0011344 | A1 | * | 1/2011 | Van Den Berg | 119/14.08 |

FOREIGN PATENT DOCUMENTS

| | | |
|---|---|---|
| JP | S52-13349 | 8/1993 |
| JP | 2001304316 A | 10/2001 |
| JP | 2003014022 A | 1/2003 |
| JP | 2007255539 A | 10/2007 |
| JP | 2008055541 A | 3/2008 |

* cited by examiner

*Primary Examiner* — Justin Krause
*Assistant Examiner* — Matthew R Vaerewyck
(74) *Attorney, Agent, or Firm* — Quinn Law Group, PLLC

(57) ABSTRACT

A torsion spring comprises an inner mounting segment. An outer mounting segment is located concentrically around the inner mounting segment. A plurality of splines extends from the inner mounting segment to the outer mounting segment. At least a portion of each spline extends generally annularly around the inner mounting segment.

10 Claims, 3 Drawing Sheets

PLANAR TORSION SPRING

GOVERNMENT INTEREST

The invention described herein was made in the performance of work under NASA Contract No. SAA-AT-07-003, as is subject to the provisions of Section 305 of the National Aeronautics and Space Act of 1958, as amended (42 U.S.C. 2457).

TECHNICAL FIELD

The present invention relates, generally, to a torsion spring, and more specifically, to a torsion spring for use with a robotic arm.

BACKGROUND OF THE INVENTION

Robots, in particular robotic arms, are often used in manufacturing and assembly plants to perform repetitive functions. The robotic arms often include joints to connect one portion of the robotic arm to another to facilitate the dexterity of the robotic arms and allow for relative movement between the two portions. This commonly includes the use of a rotational joint to move one portion of an arm with respect to another. Springs incorporated into the joint can be used to allow compliance between two portions of the arm. Spring compliance, or deflection, can be measured to determine the torque experienced at the joint.

The task being performed by the robotic arm determines the torque and deflection requirements of the robotic arm. Additionally, the size of the robotic arm is determined by the work which the arm will be used for and size constraints that may be associated with the working environment. The size and the capacity of the torsion spring used in the joint are, therefore, dependent on these factors as well.

SUMMARY OF THE INVENTION

A torsion spring for a robot arm that can provide increased strength and deflection with a small width is desired. A torsion spring comprises an inner mounting segment. An outer mounting segment is located concentrically around the inner mounting segment. A plurality of splines extends from the inner mounting segment to the outer mounting segment. At least a portion of each spline extends generally annularly around the inner mounting segment.

A robot arm includes a robot joint having at least one drive component and an output link mounted to the robot joint. The torsion spring is located between the robot joint and the output link of the robot arm.

A method of operating the robot arm includes mounting the inner mounting segment of the torsion spring to the at least one drive component within the robot joint and mounting the outer mounting segment of the torsion spring to the output link of the robot arm. The method further includes moving the at least one drive component within the robot joint to rotate the inner mounting segment of the torsion spring relative to the outer mounting segment of the torsion spring. The relative rotation causes a plurality of splines to elastically deform. Releasing the at least one component within the robot joint allows the plurality of splines to return to the undeformed position and the inner mounting segment of the torsion spring to return to the original rotational position.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
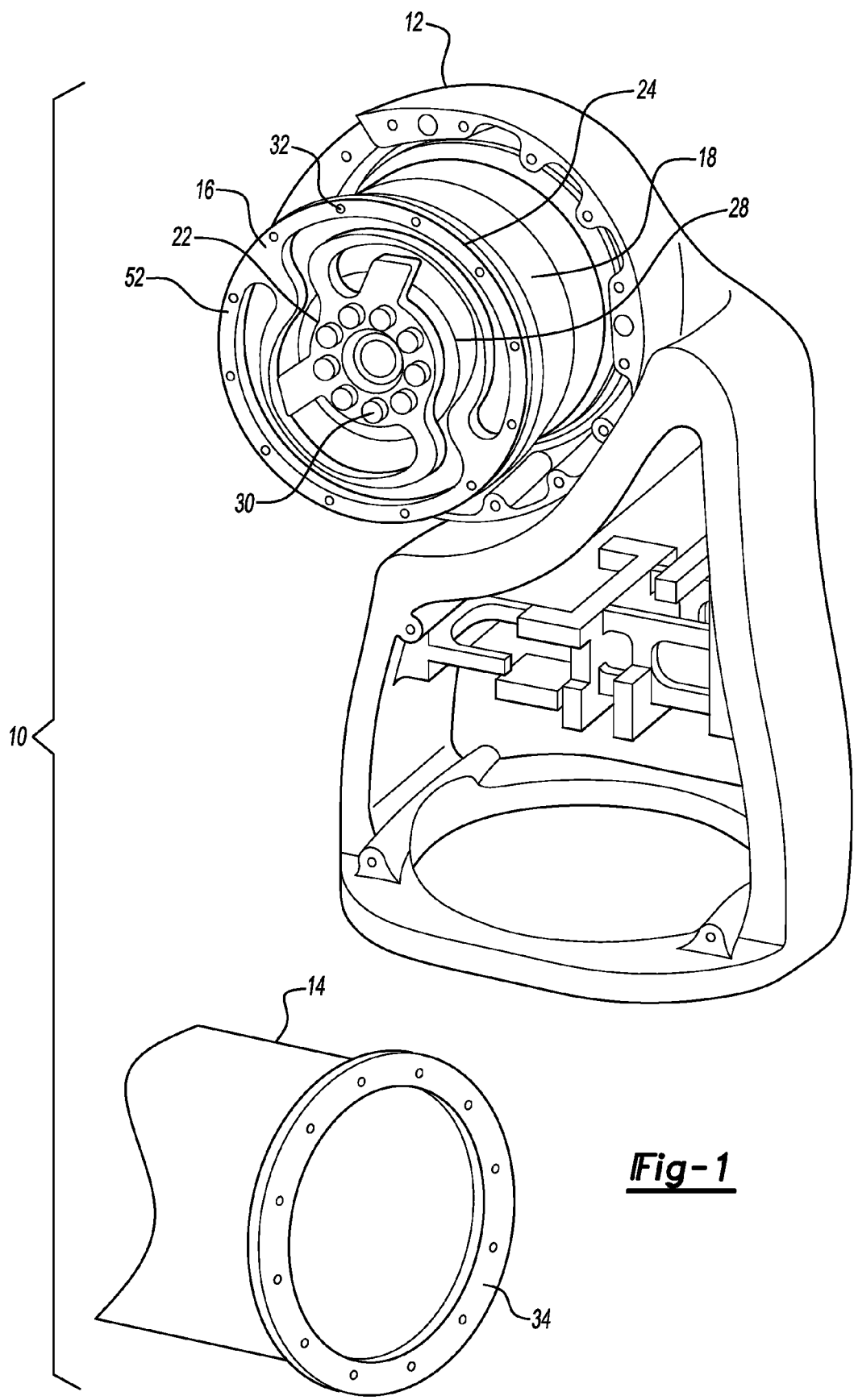
FIG. 1 is a schematic perspective view of a portion of a robot arm including a robot joint and a planar torsion spring.

Referring to the Figures, wherein like reference numbers refer to the same or similar components throughout the several views, FIG. 1 schematically illustrates a robot arm 10 including a robot joint 12 and an output link 14. A torsion spring 16 is mounted on a first portion 18 of the robot joint 12. The output link 14 can be mounted to the torsion spring 16 to form the robot arm 10.

Figure 2:
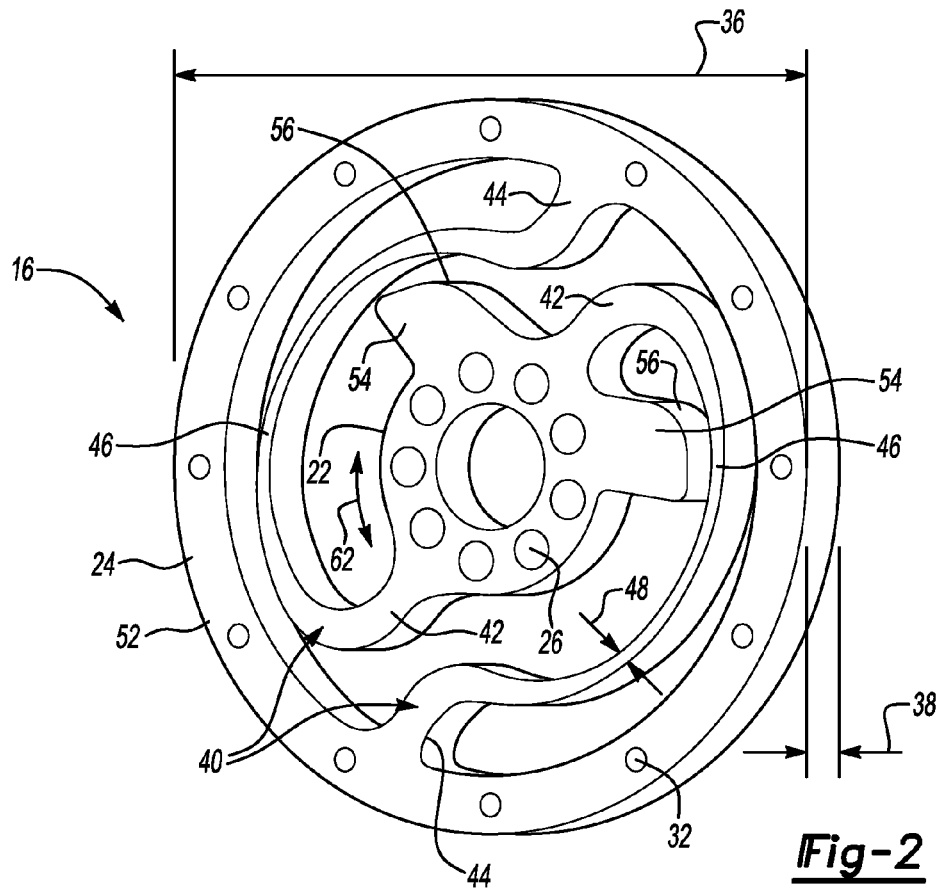
FIG. 2 is a frontal perspective view of a first embodiment of a planar torsion spring for use with the robot arm of FIG. 1.

The torsion spring 16 has an inner mounting segment 22 and an outer mounting segment 24. In the embodiment shown, the inner mounting segment 22 is a bolt circle formed by a first plurality of apertures 26 as shown in FIG. 2. The first plurality of apertures 26 (shown in FIG. 2) corresponds to drive components 28 within the first portion 18 of the robot joint 12. Bolts 30 extend through the first plurality of apertures 26 to attach the torsion spring 16 to the drive components 28 in the robot joint 12. The outer mounting segment 24 is also a bolt circle formed by a second plurality of apertures 32. The second plurality of apertures 32 corresponds to a link mounting segment 34. Bolts 30 extend through the second plurality of apertures 32 to attach the output link 14 to the torsion spring 16.

FIG. 2 is a schematic perspective view of the torsion spring 16. The torsion spring 16 has a generally planar disc shape. The torsion spring 16 has a spring diameter 36 and a spring thickness 38. The spring diameter 36 is determined based upon the size of the robotic arm 10 (shown in FIG. 1) which the torsion spring 16 will be used with. That is, the spring diameter 36 is such that, the size of the first plurality of apertures corresponds to the drive components 28 (shown in FIG. 1) and the size of the second plurality of apertures 32 corresponds to the link mounting segment 34 (shown in FIG. 1). The spring thickness 38 may be varied to satisfy the capacity requirements of the torsion spring 16. A typical spring thickness 38 in this embodiment may be one eighth to one quarter of an inch. An increase in the spring thickness 38 causes a proportional increase in stiffness of the torsion spring 16. The torsion spring 16 is preferably formed from maraging steel, which is a steel composite having high yield strength when compared with many other steels and steel composites. Other materials may also be used to form the torsion spring 16, including steel, steel composites and plastic materials. One skilled in the art would be able to determine the proper material to form the torsion spring 16 for the particular application in which it will be used.

A plurality of splines 40 extend between the inner mounting segment 22 and the outer mounting segment 24. In the embodiment shown, there are two splines 40. The number of splines 40 may be varied based upon the performance capacity required of the torsion spring 16. For example, an increase in the number of splines 40 may increase the spring rate of the torsion spring 16 but decrease the rotational compliance of the torsion spring 16. One skilled in the art would be able to determine the proper number of splines 40 to achieve the performance capacity desired for a particular application of the torsion spring 16.

The splines 40 are attached to the inner mounting segment 22 at a first portion 42 and are attached to the outer mounting segment 24 at a second portion 44. For each spline 40, the first portion 42 is attached to the inner mounting segment 22 at a different circumferential position than the second portion 44 is attached to the outer mounting segment 24. The first portion 42 extends radially out from the inner mounting segment 22 to a center portion 46. The second portion 44 extends radially inward from the outer mounting segment 24 to the center portion 46. The center portion 46 extends generally annularly around the circumference of the inner mounting segment 22 and within the circumference of the outer mounting segment 24. In FIG. 2, the splines 40 extend in a clockwise direction from the inner mounting segment 22 to the outer mounting segment 24.

The splines 40 each have a spline width 48. The spline width 48 varies along the center portion 46. The spline width 48 increases as the center portion 46 approaches the first portion 42 and the second portion 44 and narrows in the middle of the center portion 46. By increasing or decreasing the average spline width 48 the spring rate of the torsion spring 16 may be changed. One skilled in the art would be able to determine the proper spring rate and spline width 48 for a particular application of the torsion spring 16.

Figure 3:
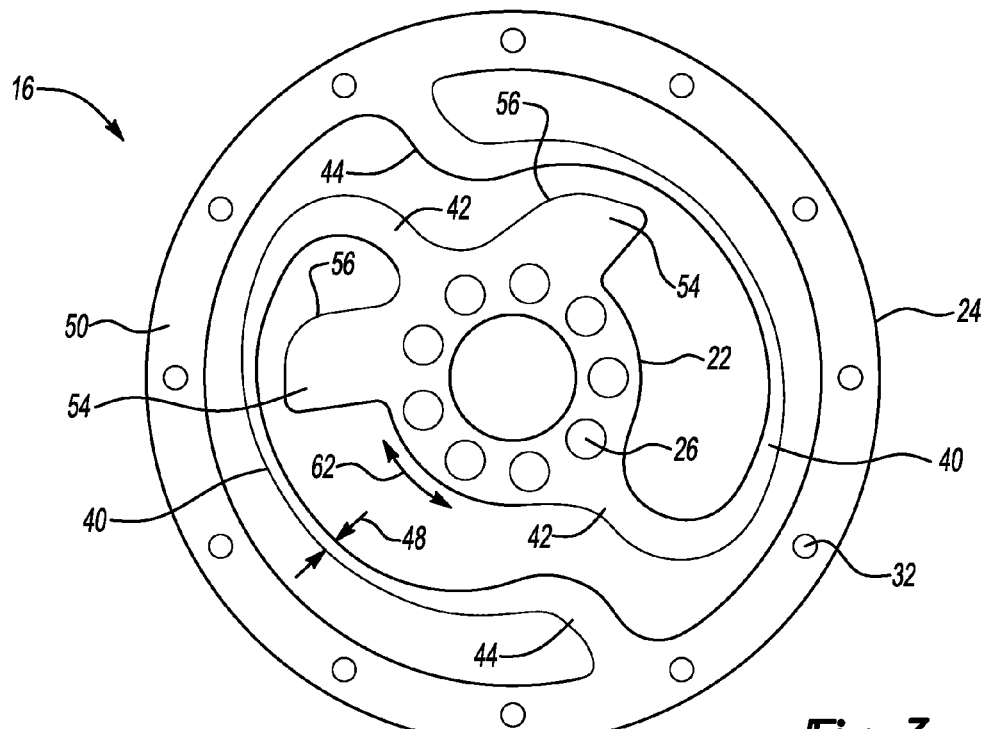
FIG. 3 is a rear view of the first embodiment of the planar torsion spring for use with the robot arm of FIGS. 1 and 2.

FIG. 3 shows the torsion spring 16 from an opposing face 50. That is, FIG. 2 illustrates a first face 52 and FIG. 3 illustrates and opposing face 50. In FIG. 2, the splines 40 extend in a clockwise direction from the inner mounting segment 22 to the outer mounting segment 24. In the FIG. 3 the splines 40 extend in a counter-clockwise direction from the inner mounting segment 22 to the outer mounting segment 24. The torsion spring 16 may be mounted to the robot arm 10 (shown in FIG. 1) such that first face 52 or the opposing face 50 are in contact with the link mounting segment 34.

In operation, the inner mounting segment 22 is actively rotated, by the drive components 28 of the robot joint 12. The rotation of the inner mounting segment 22, by the drive components 28 will cause the outer mounting segment 24 and the subsequent output link 14 of the robot arm 10 to rotate if there are no outside forces acting on the output link 14. However, if outside forces are acting on the output link 14, the splines 40 will elastically deform causing relative motion between the inner mounting segment 22 and outer mounting segment 24 of the torsion spring 16, as indicated by arrow 62 of FIGS. 2 and 3. Removing the net torque between the drive component 28 and the output link 14 will allow the splines 40 to return to the undeformed position.

The splines 40 allow for the relative rotational movement between the inner mounting segment 22 and the outer mounting segment 24. Tabs 54 protrude radially outward from the inner mounting segment 22. As the inner mounting segment 22 is rotated relative to the outer mounting segment 24, an outer surface 56 of the tabs 54 may contact extensions (not shown) on the output link 14 to provide a positive stop for the torsion spring 16. In the embodiment shown, for example, the torsion spring 16 may deflect up to 5 degrees when the maximum torque load is applied to the inner mounting segment 22. To prevent further deflection, the tabs 54 would contact the extensions on the output link 14 of the robot arm 10 at 5 degrees of deflection.

Figure 4:
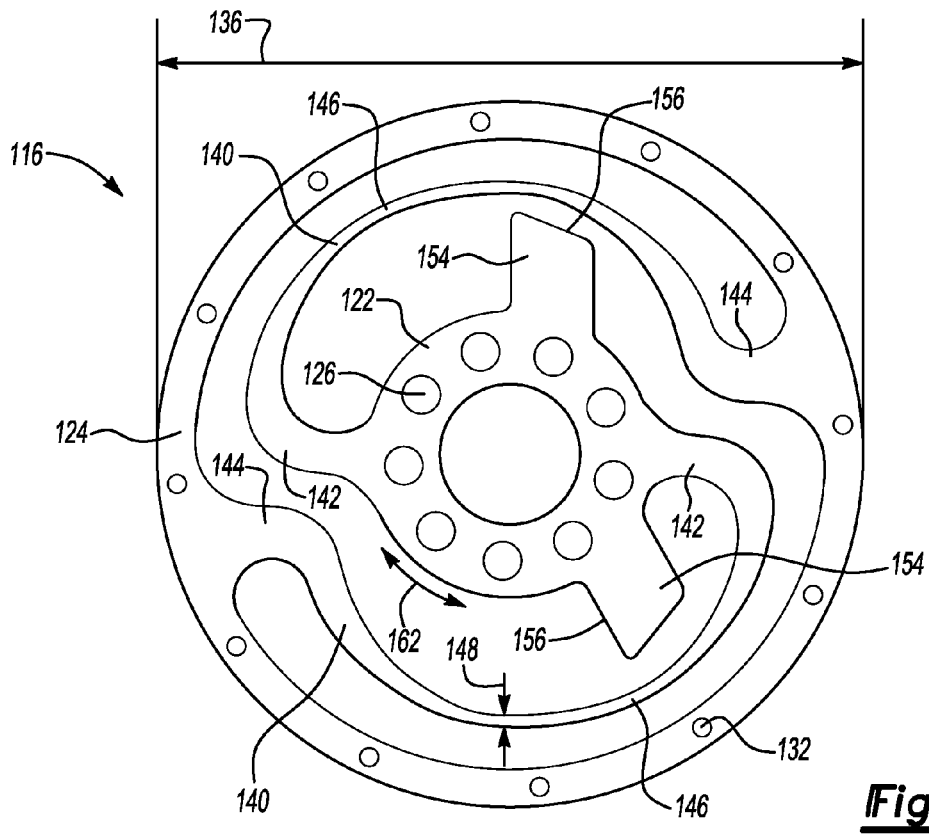
FIG. 4 is a second embodiment of a planar torsion spring for use with the robot arm of FIG. 1.

FIG. 4 shows another embodiment of a torsion spring 116. The torsion spring 116 operates in a similar manner as described above. The torsion spring 116 has an inner mounting segment 122 and an outer mounting segment 124. In the embodiment shown, the inner mounting segment 122 is a bolt circle formed by a first plurality of apertures 126. The outer mounting segment 124 is also a bolt circle formed by a second plurality of apertures 132.

The torsion spring 116 has a generally planar disc shape. The torsion spring 116 defines a spring diameter 136 and a spring thickness. The spring diameter 136 is determined based upon the size of the bolt circle formed by the second plurality of apertures 132. The spring thickness may be varied to satisfy the capacity requirements of the torsion spring 116. An increase in the spring thickness causes a proportional increase in the stiffness of the torsion spring 116.

The splines 140 are attached to the inner mounting segment 122 at a first portion 142 and are attached to the outer mounting segment 124 at a second portion 144. For each spline 140, the first portion 142 is attached to the inner mounting segment 122 at a different circumferential position than the second portion 144 is attached to the outer mounting segment 124. The first portion 142 extends radially out from the inner mounting segment 122 to a center portion 146. The second portion 144 extends radially inward from the outer mounting segment 124 to the center portion 146. The center portion 146 extends generally annularly around the circumference of the inner mounting segment 122 and within the circumference of the outer mounting segment 124. The splines 140 on the torsion spring 116 extend in clockwise direction from the inner mounting segment 122 to the outer mounting segment 124.

The splines 140 each have a spline width 148. The spline width 148 varies along the center portion 146. The spline width 148 increases as the center portion 146 approaches the first portion 142 and the second portion 144 and narrows in the middle of the center portion 146. The splines 140 have a decreased average spline width 148 when compared with the splines 40 of FIG. 2. As discussed above, by increasing or decreasing the average spline width 148 the spring rate of the torsion spring 116 may be changed. One skilled in the art would be able to determine the proper spring rate and spline width 148 for a particular application of the torsion spring 116.

In operation, the inner mounting segment 122 is actively rotated by the drive components 28 of the robot joint 12 to move relative to the outer mounting segment 124, as indicated by arrow 162. The splines 140 allow for the relative rotational movement. Tabs 154 protrude radially outward from the inner mounting segment 122. As the inner mounting segment 122 is rotated relative to the outer mounting segment 124, an outer surface 156 of the tabs 154 may contact extensions (not shown) from the output link 14 to provide a positive stop for the torsion spring 16.

Figure 5:
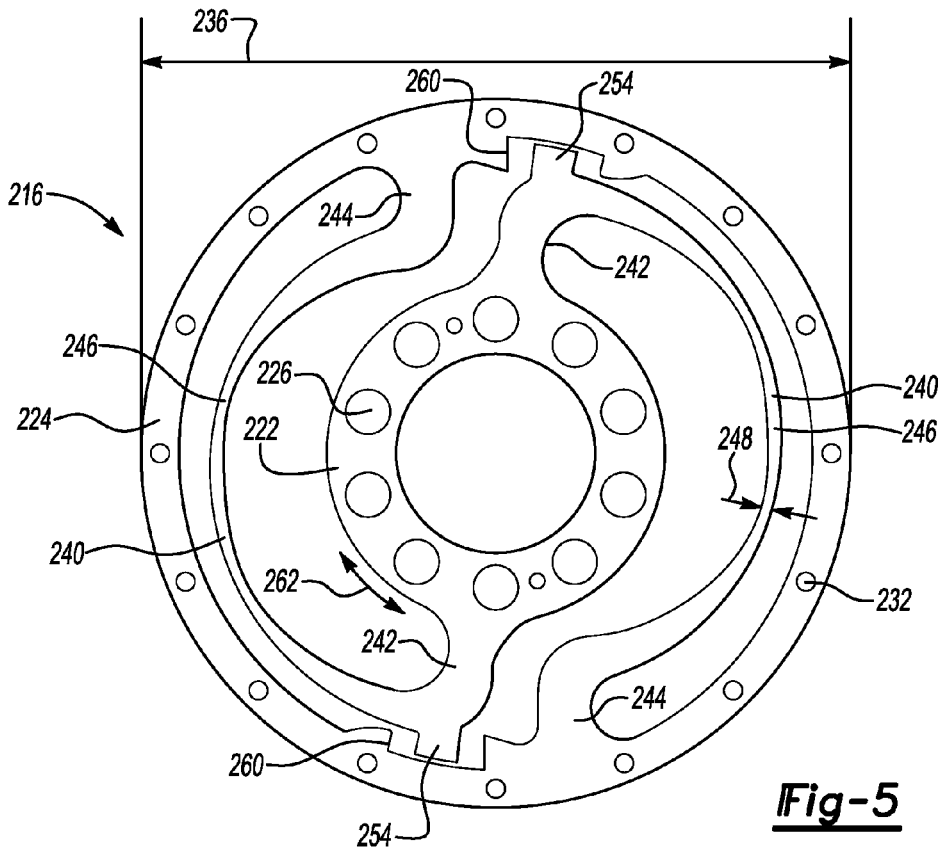
FIG. 5 is a third embodiment of a planar torsion spring for use with the robot arm of FIG. 1.

FIG. 5, is another embodiment of a torsion spring 216. The torsion spring 216 operates in a similar manner as described above. The torsion spring 216 has an inner mounting segment 222 and an outer mounting segment 224. In the embodiment shown, the inner mounting segment 222 is a bolt circle formed by a first plurality of apertures 226. The outer mounting segment 224 is also a bolt circle formed by a second plurality of apertures 232.

The torsion spring 216 has a generally planar disc shape. The torsion spring 216 defines a spring diameter 236 and a spring thickness. The spring diameter 236 is determined based upon the size of the bolt circle formed by the second plurality of apertures 226. The spring thickness may be varied to satisfy the capacity requirements of the torsion spring 216. An increase in the spring thickness causes a proportional increase in the stiffness of the torsion spring 216.

The splines 240 are attached to the inner mounting segment 222 at a first portion 242 and are attached to the outer mounting segment 224 at a second portion 244. For each spline 240, the first portion 242 is attached to the inner mounting segment 222 at a different circumferential position than the second portion 244 is attached to the outer mounting segment 224. The first portion 242 extends radially out from the inner mounting segment 222 to a center portion 246. The second portion 244 extends radially inward from the outer mounting segment 224 to the center portion 246. The center portion 246 extends generally annularly around the circumference of the inner mounting segment 222 and within the circumference of the outer mounting segment 224. The splines 240 on the torsion spring 216 extend in clockwise direction from the inner mounting segment 222 to the outer mounting segment 224.

The splines 240 each have a spline width 248. The spline width 248 varies along the center portion 246. The spline width 248 increases as the center portion 246 approaches the first portion 242 and the second portion 244 and narrows in the middle of the center portion 246. As discussed above, by increasing or decreasing the average spline width 248 the spring rate of the torsion spring 216 may be changed. One skilled in the art would be able to determine the proper spring rate and spline width 248 for a particular application of the torsion spring 216.

In operation, the inner mounting segment 222 is rotated relative to the outer mounting segment 224, as indicated by arrow 262. The splines 240 allow for the relative rotational movement.

Tabs 254 protrude radially outward from the splines 240. Notches 260 located in the outer mounting segment 224 provide a stop to prevent unwanted deflection of the torsion spring 216. As the inner mounting segment 222 is rotated relative to the outer mounting segment 224 the tabs 254 may contact the notches 260 to provide a positive stop for the torsion spring 216. The inner mounting segment 222 may be rotated in the clockwise or the counter-clockwise direction relative to the outer mounting segment 224 and the notches 260 provide a positive stop for the tabs 254 for both rotational directions. This feature provides a positive stop for the torsion spring without requiring modifications or additions to other components of the robot arm 10.

While the best modes for carrying out the invention have been described in detail, those familiar with the art to which this invention relates will recognize various alternative designs and embodiments for practicing the invention within the scope of the appended claims.

The invention claimed is:

1. A torsion spring comprising:
an inner mounting segment;
an outer mounting segment located concentrically around the inner mounting segment;
a plurality of splines extending from the inner mounting segment to the outer mounting segment, wherein at least a portion of each spline extends partially annularly around the inner mounting segment; and
a plurality of tabs, each respectively protruding radially outward from a center portion of one of the plurality of splines, wherein the center portion extends in a partially annular direction around the inner mounting segment, wherein the plurality of tabs contact the outer mounting segment after a predetermined amount of relative movement between the inner mounting segment and the outer mounting segment.

2. The torsion spring of claim 1, wherein each of the splines further comprises:
a first portion extending radially inward toward the inner mounting segment;
a second portion extending radially outward toward the outer mounting segment; and
wherein the center portion is located between the first portion and the second portion.

3. The torsion spring of claim 1, further comprising a plurality of notches formed by the outer mounting segment, wherein the plurality of tabs each contact the plurality of notches respectively after a predetermined amount of relative movement between the inner mounting segment and the outer mounting segment.

4. The torsion spring of claim 3, wherein the relative movement between the inner mounting segment and the outer mounting segment is in one of the clockwise and the counter-clockwise direction.

5. The torsion spring of claim 1, wherein at least one of a spline width, spring width, spring thickness, and number of splines determine a spring rate for the torsion spring and maximum load capacity for the torsion spring.

6. A robot arm comprising:
a robot joint having at least one drive component;
an output link mounted to the robot joint;
a torsion spring located between the at least one drive component and the output link, wherein the torsion spring includes;
an inner mounting segment connected to the at least one drive component;
an outer mounting segment located concentrically around the inner mounting segment, wherein the outer mounting segment is connected to the output link;
a plurality of splines extending from the inner mounting segment to the outer mounting segment, wherein at least a portion of each spline extends partially annularly around the inner mounting segment; and
a plurality of tabs, each respectively protruding radially outward from a center portion of one of the plurality of splines, wherein the center portion extends in a partially annular direction around the inner mounting segment, wherein the plurality of tabs contact the outer mounting segment after a predetermined amount of relative movement between the inner mounting segment and the outer mounting segment.

7. The robot arm of claim 6, wherein each of the splines further comprises:
   a first portion extending radially inward toward the inner mounting segment;
   a second portion extending radially outward toward the outer mounting segment; and
   wherein the center portion is located between the first portion and the second portion.

8. The robot arm of claim 6, further comprising a plurality of notches formed by the outer mounting segment, wherein the plurality of tabs each contact the plurality of notches respectively after a predetermined amount of relative movement between the inner mounting segment and the outer mounting segment.

9. The robot arm of claim 8, wherein the relative movement between the inner mounting segment and the outer mounting segment is in one of the clockwise and the counter-clockwise direction.

10. The robot arm of claim 6, wherein at least one of a spline width, spring width, spring thickness, and number of splines determine a spring rate for the torsion spring and maximum load capacity for the torsion spring.

* * * * *